Jan. 7, 1964   G. A. GUCKEL   3,116,765
METERING APPARATUS FOR FILLING CONTAINERS
Filed Sept. 19, 1960   3 Sheets-Sheet 1
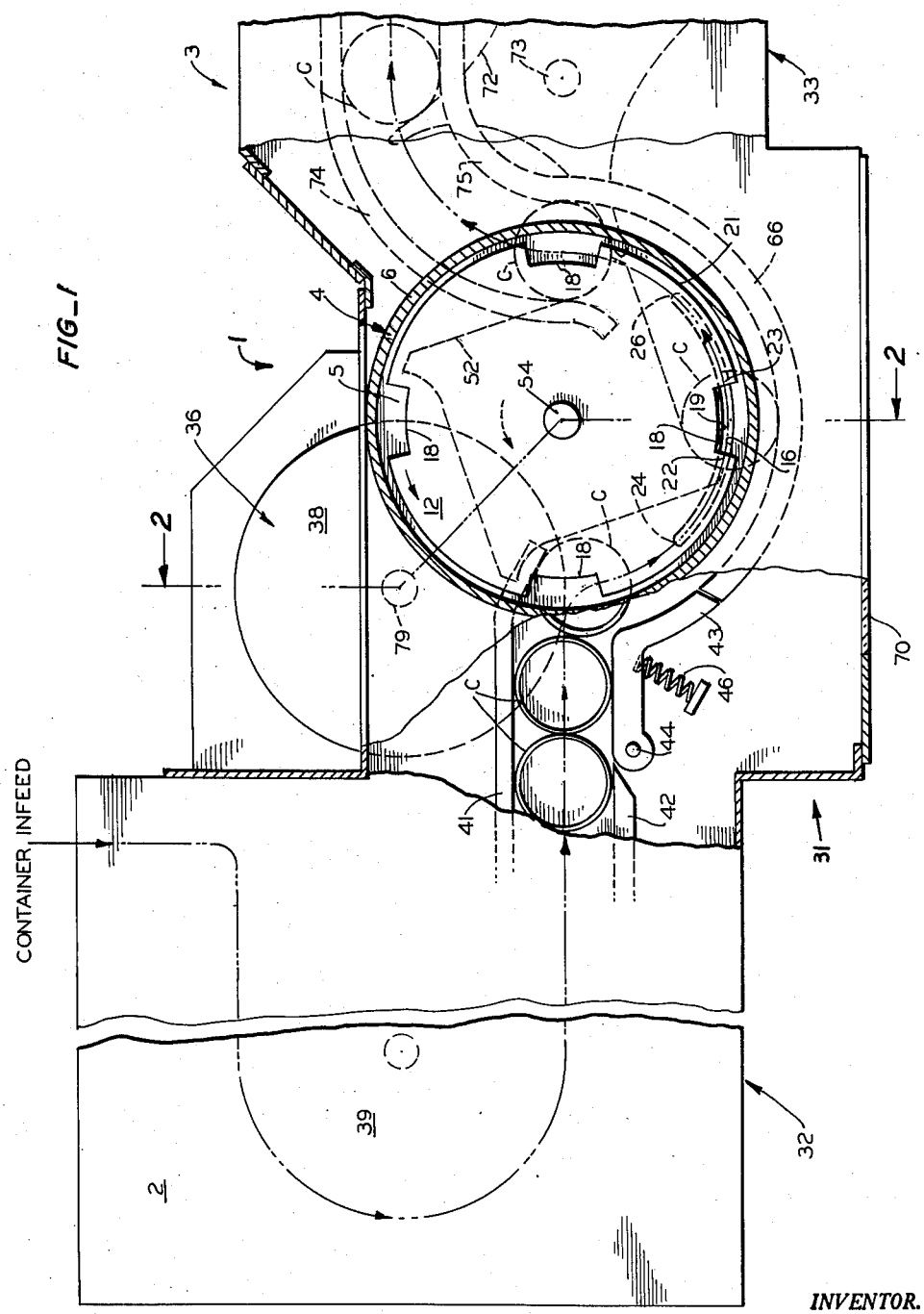
FIG_1
INVENTOR.
GERHART A. GUCKEL
BY
ATTORNEYS Jan. 7, 1964  G. A. GUCKEL  3,116,765
METERING APPARATUS FOR FILLING CONTAINERS
Filed Sept. 19, 1960  3 Sheets-Sheet 2
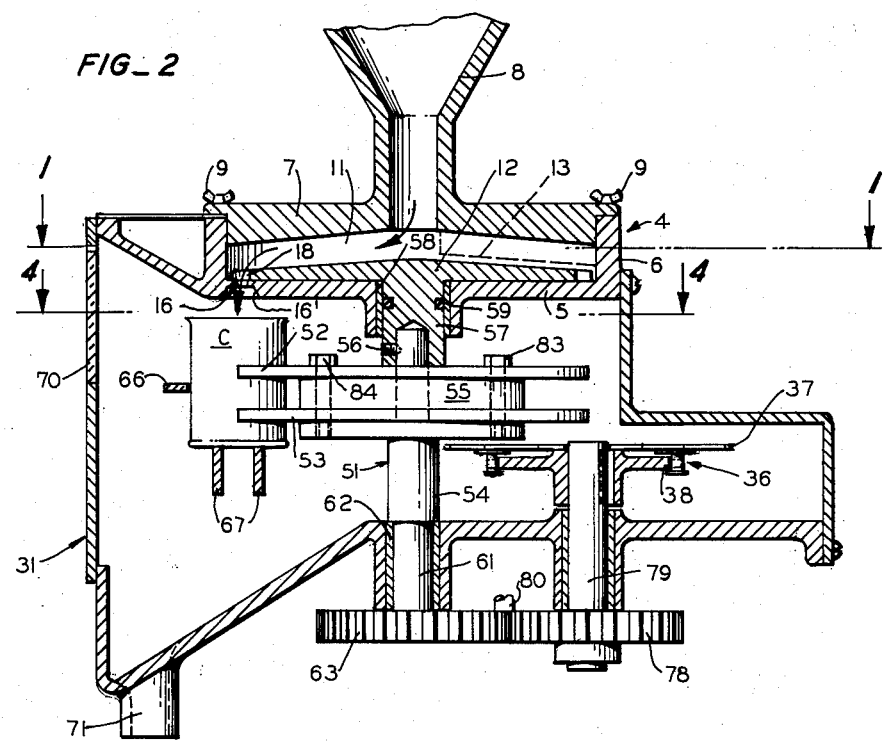
FIG_2
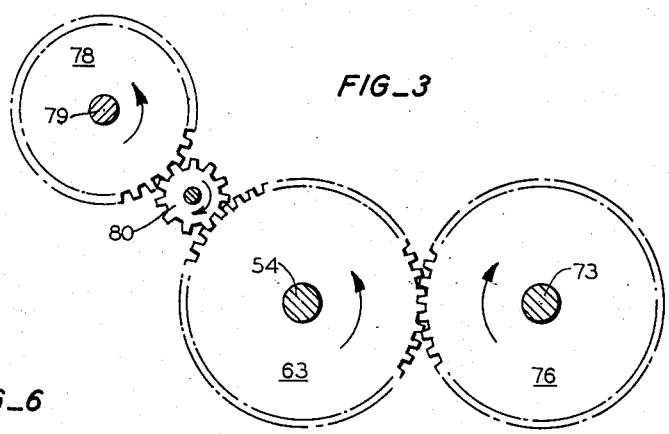
FIG_3
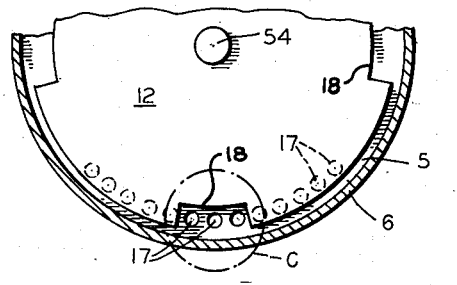
FIG_6
INVENTOR.
GERHART A. GUCKEL
BY Bialos & Schlemmer
ATTORNEYS Jan. 7, 1964 G. A. GUCKEL 3,116,765
METERING APPARATUS FOR FILLING CONTAINERS
Filed Sept. 19, 1960 3 Sheets-Sheet 3
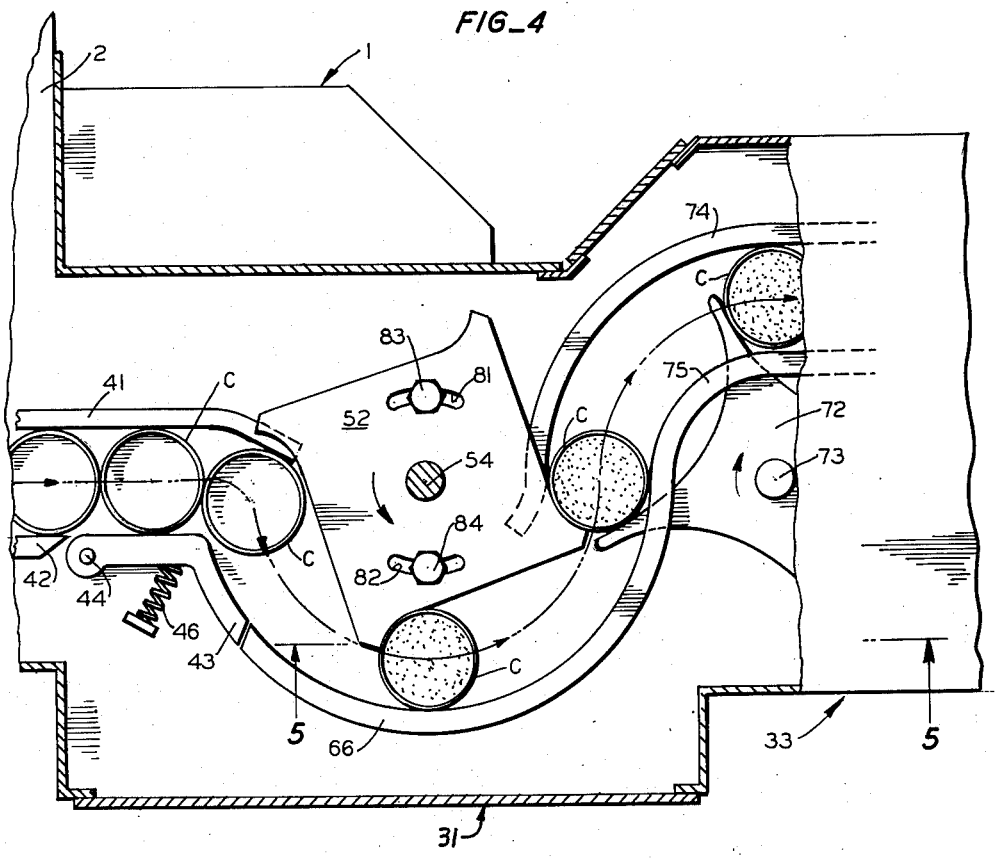
FIG_4
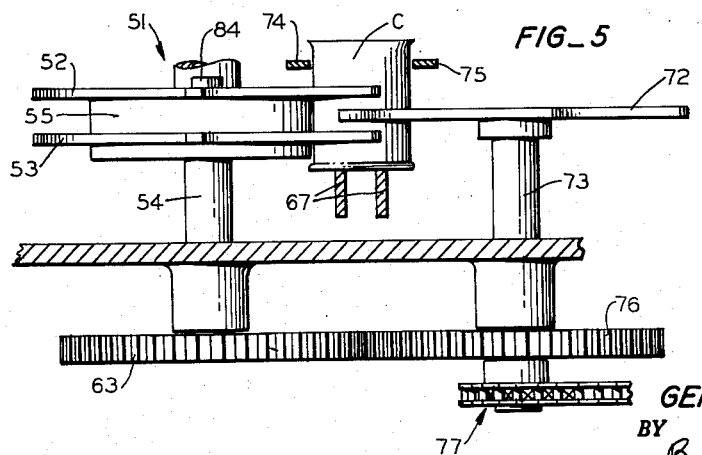
FIG_5
INVENTOR.
GERHART A. GUCKEL
BY Bialos & Schlemmer
ATTORNEYS United States Patent Office 3,116,765
Patented Jan. 7, 1964

3,116,765
METERING APPARATUS FOR FILLING
CONTAINERS
Gerhart A. Guckel, Los Altos, Calif., assignor to James
Dole Engineering Co., San Francisco, Calif., a corporation of Nevada
Filed Sept. 19, 1960, Ser. No. 56,782
8 Claims. (Cl. 141—134)

This invention relates generally to an apparatus for metering a product, and more particularly to an improved apparatus for the filling of a flowable product into a series of continuously and rapidly moving containers without product spillage. The subject apparatus is well suited for metering a sterile product into sterile containers in an aseptic processing system, such as that disclosed in applicant's assignee's Patent No. 2,667,424, dated January 26, 1954. However, the subject apparatus is well suited for use in other processes and metering systems as well.

This invention generally involves metering a product by moving a stream of such product in a predetermined direction while simultaneously moving a container to be filled in the same direction as and in timed relationship with movement of the traveling product stream so that spillage of the metered product is precluded.

In applicant's assignee's earlier Patent No. 2,631,768, dated March 17, 1953, another container filling apparatus and method are disclosed in which a product stream travels in timed relationship with a moving container to be filled. The present invention, while in some general respects similar to the apparatus and method for such patent, is an improvement thereover. While the filler apparatus of such patent is highly effective under most operating conditions, when such apparatus is employed at high speeds or when a very fluid product, such as milk, is being metered, the product stream tends to whip, which occasionally may cause spillage. Because such apparatus includes a hollow rotatable valve member in the interior of which the product to be metered is located, at high speeds the tendency of a moving product stream to whip is attributable to the inertia effect applied to the product which is produced by rotation of the valve member. That is, the metered product tends to rotate with and in the same direction as the valve member. Furthermore, because the streams of product metered by the patented apparatus are discharged by means of a helical groove which passes across a slot in the bottom of the apparatus casing, any product stream whipping is directed generally laterally of the casing and in a direction transverse to the direction in which the containers are moved relative to the metering apparatus. As a result, product spillage occasionally results in that the position of the containers may not be adjusted relative to the direction of whipping to compensate for such lateral whipping.

With the present invention, however, as will be described in detail hereinafter, any tendency of the product stream to whip may be eliminated or greatly minimized. However, even if a certain degree of whipping action occurs at higher speeds when a very fluid product is metered, because of the structural arrangement of the subject apparatus, the position of the containers being filled may be adjusted relative to the traveling product streams so that compensation may be made to overcome whipping so that product spillage may be obviated. This is so because with the subject apparatus any whipping of a product stream will be effected in the same direction in which the container to be filled is traveling, rather than laterally thereof as in the prior apparatus.

The present apparatus is of very simple and rugged construction and comprises a minimum of moving parts so that a very compact apparatus results. The compact and simple filler unit may be easily disassembled for cleaning and the like and, because of its compact structure, the unit may be easily sterilized when the apparatus is employed in an aseptic canning process.

The present invention employs an apparatus which effects the continuous and uniform filling of containers by metering a product into a series of containers as the same move past the filler apparatus by moving valve control plate structure over a product slot structure in the apparatus so that discrete product streams are discharged into separate containers. The apparatus is equally well suited for filling containers having their mouths spaced apart from each other, such as glass jars or cans, as well as for filling containers positioned closely adjacent one another, such as cans having their flanges contacting each other or overlapped. The present invention is equally well suited for metering products of various types and viscosities such as products which are comprised of discrete particles or liquiform products comprised of a homogeneous liquid. The subject filler apparatus may be used to meter various edible products such as purees, baby foods, milk, soups and the like. Additionally, the apparatus is equally well suited for metering non-edible products, such as motor oil, lotions and the like.

Summarizing this invention and the objects thereof, the same relates to a product metering apparatus, which apparatus comprises a filler casing having mounted therein valve control structure which is movable relative to slot structure provided through a casing wall and past which a series of containers to be filled are movable. The valve control structure comprises plate means which is movable in a predetermined fashion past the slot structure in the casing wall to periodically and progressively cover and uncover the slot structure so that a stream of product is metered through the slot structure which, during such metering, travels the length of the slot structure in timed relationship with movement of a container therepast. In conjunction with the filler casing, conveyor mechanism is provided for carrying a continuous supply of containers in timed relationship past the filler casing in an uninterrupted motion. With this metering apparatus one or more containers may be filled at a time as may be desired.

Various other related features of the present apparatus and additional objects thereof will become apparent to one skilled in the art from reading the following disclosure, in which reference is directed to the accompanying drawings.

FIG. 1 is a partial cutaway plan view of the subject product metering apparatus.

FIG. 2 is a vertical sectional view taken through the apparatus in the plane of line 2—2 of FIG. 1.

FIG. 3 is a more or less schematic view of a gear train arrangement employable with the subject apparatus.

FIG. 4 is a horizontal sectional view taken through the apparatus in the plane of line 4—4 of FIG. 2.

FIG. 5 is a partial vertical sectional view taken through the apparatus in the plane of line 5—5 of FIG. 4.

FIG. 6 is a partial horizontal section similar to FIG. 1 illustrating a modified filler casing slot structure.

The subject apparatus generally embody the metering of one or more discrete streams of product from a filler casing and causing such metered streams to move in a predetermined direction in conjunction with movement of a series of containers to be filled in the same predetermined direction so that the stream or streams of product are automatically filled into the containers without spillage. By regulating the distance in which the stream travels, and by controlling the size of the stream itself, a given amount of product may be metered in a given unit of time. Because the product stream and the container to be filled are moved in the same predetermined direction, product spillage may be eliminated in that any tendency of the product stream to whip, such as during very high speed operation of the apparatus or when a very fluid product is being metered, may be compensated for by setting ahead or retarding slightly a container to be filled relative to the product stream.

As seen in FIG. 1, the subject filler apparatus 1 is well suited to be employed in conjunction with suitable container sterilizing apparatus 2 in a continuous aseptic canning process such as that disclosed in aforementioned Patent No. 2,677,424. In such a process, and following container sterilization in the sterilizing section, the containers C to be filled desirably are carried directly into the filler section defined by the apparatus of this invention. After filling, the containers desirably are carried directly into a cover sterilizing and container closing section 3 in which the filled containers are sealed. It should be understood, however, that this invention is not limited to use in an aseptic canning process and that the same has many and varied other uses.

The filler apparatus desirably comprises a generally upright cylindrical casing 4 which is defined by a bottom wall 5, a substantially circular sidewall 6 and a top wall 7 with which is integrally connected a product inlet port 8. Top wall 7, as shown in FIG. 2, is detachably connected to the casing side wall by any suitable fastening means, such as thumb screws 9. The top 7 of the casing thus may be easily and rapidly removed to permit casing cleaning and apparatus maintenance.

The casing has a hollow interior which defines a product receiving space 11 which is bounded by the respective casing walls. It is in such hollow interior that valve control structure is movably mounted for regulating and controlling the flow of product in a controlled and predetermined manner from the casing in conjunction with movement of containers C therepast. Such valve control structure in the embodiment illustrated comprises plate means in the form of a substantially flat, circular valve plate 12 which is rotatably mounted above the casing bottom wall and in slidable leak proof contact therewith. As will be described, upon rotation of plate 12 relative to the casing bottom wall, one or more streams of product may be metered from the casing in a predetermined controlled manner in accordance with rotary movement of the plate.

Because plate 12 rotates in the casing interior, at high speeds there may be some tendency of the product being metered, due to inertia effects, to rotate or swirl with the plate as the same moves in the casing. Such problem may occur particularly when the product being metered is of a very fluid nature. However, any such swirling may be counteracted by providing means, such as baffles 13, depending from the casing top 7 and extending to a location adjacent the top of the plate 12 as shown in phantom lines in FIG. 2. One or more such baffles, it should be understood, may be selectively located at one or more predetermined spaced positions in the casing interior to prevent rotary movement of the product with the plate 12.

Provided through a wall of the casing 3 and preferably through bottom wall 5 thereof adjacent circular side wall 6 is elongated slot structure 16 which extends in a predetermined direction. That is, slot structure 16, as shown in FIG. 1, desirably extends through the casing bottom wall in a predetermined direction which is defined generally by an arc of a circle. The length of the arcuate slot structure will be determined by the number of containers to be filled at one time by the filler casing in the manner to be described.

As also seen in FIG. 1 the circular valve plate 12 normally covers at least part of slot structure 16 so that passage of product through the slot structure may be selectively controlled by the valve plate. That is, the slot structure through the bottom wall of the filler casing may be closed by the valve plate in a controlled manner so that product may be precluded from flowing from the casing.

In the embodiment shown in FIG. 1, slot structure 16 comprises a single continuous elongated slot. However, as shown in FIG. 6, such slot structure also may comprise, if desired, a series of closely spaced but discrete holes 17 which similarly may be selectively covered or uncovered by the valve plate 12. While the single continuous arcuate slot shown in FIG. 1 is preferred, the arcuate series of discrete holes 17 illustrated in FIG. 6 desirably may be employed when particulate products are to be metered. As used hereinafter in the claims, however, slot structure is intended to cover either one continuous slot or a substantially continuous slot defined by such a series of closely spaced holes. Preferably, slot 16 is relieved or undercut, as at 16′ in FIG. 2, to obviate product dripping.

To effect product metering from the filler casing 3 in a controlled manner, valve plate 12 is provided with at least one product discharge port 18 which is defined by a generally rectangular cut-out 19 extending inwardly from the circular peripheral edge 21 of the plate which is positioned closely adjacent the side wall 6 of the casing. That is, discharge port 18 extends inwardly from the plate edge and the angular limits thereof are defined by a pair of spaced plate cover portions 22 and 23 which lie on opposite sides thereof. Discharge port 18 is periodically alignable with to overlie the slot 16 provided in the casing bottom wall. As a result, as plate 12 rotates, discharge port 18 is periodically and progressively moved the length of slot 16 so that product introduced into the casing on top of the plate may flow downwardly through the discharge port and through the slot from the casing. As discharge port 18 moves relative to the bottom wall of the casing, a product stream metered thereby will travel therewith the length of the slot from one end thereof to the other. In the embodiment shown in FIG. 1 plate 12 is mounted to rotate counterclockwise so that when a discharge port 18 reaches one end 24 of slot 16 the product metering cycle commences and when such port 18 passes over the opposite cut-off end 26 of the slot 16 the product discharge cycle automatically stops.

Depending upon the length and width of the slot, the number of slots provided, the number and length of discharge ports, the viscosity of the product, the speed of rotation of the valve plate, and the like, a predeterminable quantity of product may be metered by the subject apparatus in a given unit of time. If so desired, the configuration of the discharge slot may be modified along its length to vary selectively the product flow therethrough to preclude mounding of the product filled into a container.

While the subject apparatus would function properly if only one discharge port were provided in the peripheral margin of the valve plate, the metering operation may be speeded by employing more than one discharge port 18 as shown in FIG. 1. Similarly, while only one elongated slot 16 is illustrated, more than one slot could be employed if it is desired to simultaneously meter more than one traveling stream from the filler casing.

In the embodiment illustrated which employs four product discharge ports 18 for sequentially and periodically uncovering the discharge slot, the length of the discharge slot is substantially 90° and the discharge ports are spaced with their centers approximately 90° apart. In this manner, as one discharge port begins to uncover one end 24 of the slot the other discharge port will just be passing the cut-off end 26 of the slot. This arrangement is desirable because preferably the product being metered is fed into the casing through entry port 8 under pressure by means of a constant volumetric flow pump or the like. Accordingly, if an attempt is made to completely shut off slot 16 at any given time, casing damage might result due to the pressure under which the product is inserted. However, if gravity feed were employed for introducing product into the casing, it would not be necessary for the slot to be at least partially open at all times.

If more than four discharge ports were employed in the filler casing plate 12, the length of slot 16 could be decreased accordingly. In line with the foregoing, for example, if six discharge ports were employed, the length of the slot need only be 60°, while if eight discharge ports were employed the length of the slot need only be 45°. Similarly if more than one slot 16 were to be employed the slot lengths heretofore mentioned could be proportionally reduced to effect the same product flow rate in the same given time. As a further alternative, more than one container could be simultaneously located beneath a given slot by properly providing the plate 12 with properly spaced discharge ports. In this connection, a plate having eight discharge ports evenly spaced 45° apart could properly be employed with a casing having one 90° slot.

Because, as noted previously, the subject filler apparatus is well suited for use in aseptic canning processes, desirably the filler apparatus when so employed is surrounded by a housing 31 so that the filler casing 3 may be maintained under sterile conditions in the manner disclosed in Patent No. 2,667,424. As shown in FIG. 1, housing 31 of the filler section communicates directly with the housing 32 of the container sterilizing section 2 mentioned previously. Similarly, at the discharge end of the filler section the housing 31 communicates directly with another housing 33 which defines the cover sterilizing and container closing section 3. With the arrangement illustrated, containers may be rapidly and continuously sterilized, filled with a sterile product, and sealed in one uninterrupted high speed operation.

As seen in FIGS. 1 and 2, containers C to be filled may be carried through the sterilizing section 2 and into filler section 1 by means of a so called table top conveyor 36 of any suitable type. Preferably such conveyor comprises a container supporting movable sectional platform 37 which extends between and travels around a pair of sprocket wheels 38 and 39. Accordingly, as containers are placed on the table top conveyor adjacent one end of the sterilizer section 2, they are carried in a generally U-shaped path through the sterilizer and discharged to the filler section. Desirably the containers in the sterilizer are moved in contact with each other to conserve space and, as seen in FIG. 1, in the sterilizing section such containers are moved between a pair of spaced container bar guides 41 and 42. At the container infeed end of the filler, a spring loaded guide section 43 desirably is provided which is capable of movement about a pivot pin 44 against the urging effects of a spring 46 should a container inadvertently be urged thereagainst as such container is moved from the table top conveyor beneath the casing 3 by the means to be described for conveying the containers past the filler casing.

The means for conveying containers beneath the filler casing desirably comprises star wheel structure 51 defined by a pair of vertically spaced star wheels 52 and 53 secured to a drive shaft 54 for rotation therewith by means of a mounting block 55 which is keyed or otherwise secured to the shaft. Aforementioned valve plate 12 is secured on the upper end of shaft 54 by a set screw 56. With this arrangement, it should be understood, the star wheel structure and the valve plate are mounted for simultaneous rotation on the same shaft. As shown in FIG. 2, desirably plate 12 has a depending extension 57 which extends through a bearing 58 mounted in the bottom wall of the casing in which the extension 57 is rotatable. To preclude product leakage, desirably a rubber or like leak preventing O-ring 59 is interposed between the bearing and the plate extension. The lower end 61 of drive shaft 54 is rotatably mounted in a bushing 62 provided in an aperture through the bottom of housing 31 and a gear 63 is keyed or otherwise secured thereto.

As seen in FIGS. 1 and 4, the star wheels 52 and 53 are each of four point construction with the points thereof spaced generally 90° apart in conformance with the 90° spacing of the four discharge ports 18 provided in the valve plate. Accordingly, upon rotation of the star wheels and plate by the drive shaft 54, individual containers are picked up from the sterilized container supply moved into the filler section by the table top conveyor and are moved in spaced predetermined relationship through the filler section beneath the filler casing in accordance with the spacing of the discharge ports in the plate. As seen in FIG. 4, an arcuate guide 66 is provided beneath the filler casing for maintaining movement of the individual containers in an arcuate path therebeneath as the star wheel structure rotates.

As seen in FIG. 2, the individual containers as the same are moved beneath the casing are supported on a pair of spaced rails 67 which similarly are arcuately directed beneath the container filler casing. In this manner, and because the points of the star wheels 53 and 54 are arranged to pass beneath the discharge slots 16 provided in the filler casing, each of the individual containers is moved beneath the discharge slot desirably with its container axis substantially in line with the arcuate center of the slot throughout its entire arcuate path of travel beneath the casing. The star wheel structure 51 obviously may be modified by providing more or less star points thereon to accommodate more or less containers than illustrated so that the container filling operation may be modified as hereinbefore proposed.

So that the filling operation may be viewed for quality control and the like, desirably a glass viewing window 70 is provided in the front wall of housing 31 as seen in FIGS. 1 and 2. Similarly, so that the container filling housing may be easily cleaned and so that condensed moisture from the sterilizing steam may be withdrawn therefrom, a drain 71 may be provided in the housing adjacent the bottom thereof (FIG. 2).

After the respective containers have been moved by the star wheel structure 51 in the arcuate path described beneath the slot 16 in the casing bottom wall, additional transfer conveyor means are provided for picking up and transporting the filled containers from the filler section into the container closing section 3 defined by the housing 33. Such transfer means desirably employs another rotatable star wheel 72 mounted on a vertical shaft 73 as seen in FIGS. 1 and 4. The number of points on star wheel 72 will correspond generally to the number of points on the respective star wheels of the filler star wheel structure 51. As seen in FIG. 5 star wheel 72 may be arranged to rotatably move between the spaced star wheels 52 and 53 of the star wheel structure 51. To insure proper directional movement of the filled containers during the transfer from one star wheel to the other and during movement into the container closing section, a pair of spaced bar guides 74 and 75 are provided between which the filled containers are movable (FIG. 4).

Desirably a gear 76 is mounted on the lower end of star wheel shaft 73 which is intermeshed with and drivably connected to the gear 63 connected to aforementioned filler drive shaft 54. By operatively connecting shaft 73 with a suitable power source, such as by means of a sprocket and chain arrangement 77 such as that shown schematically in FIG. 5, the transfer star wheel 72 and the star wheel structure 51 of the filler section may be driven in timed relationship with each other from the same power source. Similarly, as shown schematically in FIG. 3, the table top conveyor 36 mentioned previously also may be driven from the same power source by operatively mounting a gear 78 on the lower end of a drive shaft 79 which is in turn keyed or otherwise connected to the conveyor sprocket 38. So that sprocket 38 and the table top conveyor moved thereby will rotate in the proper direction an idler gear 80 is interposed between gears 63 and 78 to reverse the direction of gear 78 relative to gear 63 in a well known manner. With this gear train arrangement, a single power source may be employed to actuate not only the various conveyor mechanisms employed with the subject apparatus but also the valve control structure which regulates product flow into the respective containers.

So that a constant supply of containers to be filled at all times is available at the infeed end of the filler section, desirably the table top conveyor 36 is driven 5% to 10% faster than the speed of the star wheel structure 51 of the filler casing. In this manner, a line of contacting containers will at all times be provided which may be individually stripped off and separated from the remaining containers in the line by the star wheel structure 51. The aforementioned spring loaded guide section 43 is important when the first container of a line is separated by the star wheel structure in that, if a slight misalignment at this time should occur so that a point of a star wheel structure urges a container outwardly against the section 43, the section 43 will give to preclude damage to the apparatus while the container and the star wheel structure are becoming properly aligned.

It should be understood that the subject apparatus may be operated at various speeds, determined largely by the size of the containers to be filled, the viscosity of the product being metered, and the slot and discharge port size. As illustrative of several speeds and can sizes which may be employed herewith, and without intending to be in any way limiting upon the invention, the following figures are given as being illustrative. With a container filler casing having a diameter of approximately 11½ inches in which a single discharge slot approximately 90° in length and ¼ inch in width is provided, and in which a four port valve plate having a diameter of approximately 11¼ inches is mounted, each port of which is approximately 1⅛ inches long (15°), the table top conveyor may be driven at approximately 225 inches per minute (100 cans per minute) with the star wheel structure making 25 revolutions per minute when 2⅛ inch diameter cans (202 x 214) are being filled. At such speeds, the product flow rate through the filler casing will be between three and four gallons per minute.

With larger 6³⁄₁₆ inch diameter cans (603 x 700) the table top conveyor may be driven at approximately 162 inches per minute (25 cans per minute) with the star wheel structure making 6¼ revolutions per minute with product flow rate being approximately 20 gallons per minute. As will be apparent to one skilled in the art, the speeds and product flow rates in any given period of time may be selectively varied by changing the slot size, the discharge port size and number and the like.

As noted previously with fillers which employ parts which rotate through 360° a tendency of the product streams being metered to whip may be encountered during high speed operation or when the product being metered is of a very fluid nature, such as milk. With the subject apparatus, any tendency of the traveling product streams to whip may be minimized by employing a knife edge at the cut-off end 26 of the slot 16 so that each traveling stream is actually cut abruptly as the discharge port 18 passes thereover. However, if the tendency of the traveling stream to whip persists, any such whipping will be in exactly the same direction in which the containers being filled are traveling. That is, any whipping will be in the direction defined by and is a continuation of the direction of the elongated slot structure. As a result, by advancing or retarding the containers being conveyed relative to the center of a given discharge slot 18, the whipping problem may be overcome so that spillage is precluded. This is in distinction to the prior noted apparatus in which any whipping encountered was in a direction extending generally laterally of the direction of container movement so that spillage at high speeds was difficult to overcome.

Means for advancing or retarding the containers is shown in FIG. 4 and desirably comprises adjusting slot structure provided in conjunction with the star wheel structure 51 of the filler apparatus. Each of the star wheels 52 and 53 is provided with a pair of diametrically opposite arcuate slots 81 and 82 through which a pair of bolt fasteners 83 and 84 extend as seen in FIG. 2. Such bolts are threadedly received in tapped bores provided in the bottom of mounting block 55 on which the star wheels are mounted. By loosening such bolts the points of the respective star wheels may be advanced or retarded relative to a first predetermined position so that the containers engaged by the star wheels may be moved beneath the filler casing in advanced or retarded relation relative to the streams being metered from the casing. That is, rather than having a center of a traveling stream being exactly in line with the axis of the can being filled, such stream center may be advanced or retarded relative to the container axis so that product whipping may be completely compensated for to preclude spillage.

While preferred embodiments of this invention have been illustrated and described, it should be understood that modifications thereto which may become apparent to a person skilled in the art are intended to be included in the invention and the same should be interpreted in light of the appended claims.

I claim:

1. Product metering and container filling apparatus for filling flowable product in containers, comprising a filler casing having elongated slot structure which extends in a predetermined direction in a bottom wall thereof, means for introducing product into said casing, conveyor means for moving a container to be filled with product metered directly from said casing beneath said casing in the predetermined direction defined by said slot structure, and valve control structure movably mounted in said casing for regulating product flow therethrough directly into, the container moving therebeneath without contacting intermediate measuring structure; said valve control structure comprising plate means movable relative to and overlying said casing bottom wall, said plate means including spaced plate cover portions separated from each other by and defining therebetween a discharge port; means for moving said plate means in said casing in timed relationship with movement of said container beneath said casing, said plate cover portions and discharge port being movable over said slot structure with said discharge port moving in the same predetermined direction in which said slot structure extends so that said slot structure is periodically uncovered by said discharge port as said discharge port passes thereover, whereby a traveling stream of said product is metered through said discharge port and slot structure directly into such moving container, said stream moving in the direction of said slot structure the length thereof in timed relation with movement of such container beneath said casing wall.

2. Apparatus for metering and filling a flowable product into containers comprising an upright filler casing having a bottom wall and side wall, said casing having an elongated arcuate slot provided in said bottom wall, valve control structure movably mounted in said casing for periodically covering and uncovering said slot, means for introducing product to be metered into said casing into contact with said valve control structure, and means for conveying a series of containers to be filled with product metered directly from said casing beneath said casing in an arcuate path generally corresponding to the direction in which said slot extends; said valve control structure comprising a thin generally flat valve plate rotatably mounted in said casing above said casing bottom wall and in substantial contact therewith, said valve plate having a pair of spaced cover portions positioned to periodically overlie said slot as said plate rotates relative to said bottom wall, said spaced cover portions being separated from each other by and defining a discharge port therebetween provided through said plate in line with said slot structure, said discharge port periodically passing over and progressively uncovering said slot structure as said plate rotates whereby a stream of product is metered therethrough, said product stream traveling the length of said slot structure as said discharge port moves relative thereto; and means for rotating said valve plate in timed relationship with movement of said conveyor means so that said traveling product stream is metered directly into a container without contacting intermediate measuring structure as the container is moved beneath said casing by said conveyor means.

3. The apparatus of claim 2 in which said valve plate comprises a plurality of pairs of plate cover portions each pair of which defines therebetween a product discharge port, each of said discharge ports being periodically alignable with said slot structure as said plate rotates; and in which said conveyor means includes mechanism for moving a plurality of said containers in spaced relationship beneath said casing in accordance with the spacing of said discharge ports.

4. Product metering and container filling apparatus comprising a generally upright enclosed hollow filler casing having a generally flat bottom wall, a top wall and a substantially circular side wall, said casing bottom wall having an elongated arcuate slot provided therein, means for introducing product under pressure into said casing, a generally circular plate rotatably mounted in said casing in substantial contact with said bottom wall, said plate overlying and normally covering said slot whereby product flow through said slot may be selectively precluded, conveyor means for moving a container to be filled in an arcuate path directly beneath said casing in close proximity to the bottom wall thereof but free of engagement with such wall and in line with said slot, and means for correlating rotation of said plate and movement of said container in timed relationship with each other; said plate having a cut out adjacent the edge thereof which defines a product discharge port therethrough, said discharge port being periodically alignable with said slot as said plate rotates whereby a stream of product is metered from said casing as said port moves progressively over said slot, said product stream traveling the length of said slot as said plate rotates in conjunction with movement of a container beneath said casing whereby said container is filled directly by such traveling stream, said product being introduced into said container directly from said casing without passing through intermediate product measuring structure.

5. Product metering and container filling apparatus comprising a generally upright enclosed hollow filler casing having a generally flat bottom wall, a top wall and a substantially circular side wall, said casing bottom wall having an elongated arcuate slot provided therein, means for introducing product under pressure into said casing, a generally circular plate rotatably mounted in said casing in substantial contact with said bottom wall for metering a traveling stream of product from said casing through said bottom wall slot, said plate overlying and normally covering said slot whereby product flow through said slot may be selectively precluded, conveyor means for moving without interruption a series of containers to be filled in an arcuate path and in spaced relationship beneath said slot in said casing bottom wall and in close proximity to said bottom wall, and means for correlating rotation of said plate and movement of said containers in timed relationship with each other; said plate having a plurality of spaced cut outs adjacent the edge thereof which define a plurality of product discharge ports therethrough, said discharge ports being periodically and sequentially alignable with said slot as said plate rotates whereby separate streams of product may be metered from said casing directly into said containers without passing through intermediate product measuring structure, each of said product streams passing through said slot so long as the discharge port is aligned with said slot, each of said streams traveling the length of said slot as said plate rotates in conjunction with movement of a container beneath said casing and passing directly into such container; said conveyor means including wheel structure for moving a plurality of containers beneath said casing simultaneously and in predetermined spaced relationship determined by the spacing between said discharge ports so that a container is located beneath a discharge port during container movement beneath said casing.

6. The apparatus of claim 5 in which said wheel structure is adjustably positionable relative to said plate in said casing so that the position of a given container may be selectively advanced or retarded relative to a discharge port.

7. The apparatus of claim 5 which includes baffle means in said casing above said plate for minimizing swirling and rotation of the product in said casing with said plate during rotation.

8. Apparatus for metering predetermined amount of product as a traveling product stream directly into a continuously moving container without requiring separate product flow measurement, comprising a hollow substantially enclosed casing defined by a bottom wall, a top wall and a side wall, said casing having product discharge slot structure in the bottom thereof, means for introducing a supply of product to be metered into said casing, means for supporting and moving a container beneath said casing in line with said casing slot structure and valve control structure in said casing against which said product supply is introduced whereby said valve control structure generally passes through said product during product metering, said valve control structure periodically covering and uncovering said slot structure to effect metering of said product in said traveling stream; said valve control structure comprising a thin plate rotatably mounted in said casing generally in engagement with said casing bottom, said product supply in said casing overlying and contacting said plate whereby said plate is interposed between said casing bottom and said product supply, said plate overlying and covering said slot structure so that product flow therethrough may be selectively precluded, said plate having a product discharge port therethrough which is periodically alignable with said slot structure during rotation of said plate relative to said casing bottom, said product passing through said port into and through said slot structure in said traveling stream during such alignment, and means for rotating said plate over said casing bottom in timed relationship with movement of said container therebeneath whereby said plate discharge port periodically is moved in the same general direction in which said slot structure extends so that said discharge port passes over said slot structure and uncovers the same to effect metering of said product stream directly into said container without requiring intermediate product measuring, said product stream traveling the full length of said slot structure in continuous fashion in response to continuous rotation of said plate and continuous movement of said container.

References Cited in the file of this patent

UNITED STATES PATENTS

| | | |
|---|---|---|
| 337,795 | Stalnaker | Mar. 9, 1886 |
| 893,583 | Hey et al. | July 14, 1908 |
| 939,455 | Thom | Nov. 9, 1909 |
| 1,074,585 | Champ | Sept. 30, 1913 |
| 1,095,754 | Vogt et al. | May 5, 1914 |
| 1,454,931 | Konefes | May 15, 1923 |
| 1,621,864 | Ayars | Mar. 22, 1927 |
| 1,778,216 | Hansen | Oct. 14, 1930 |
| 1,944,381 | Wamhoff | Jan. 23, 1934 |
| 2,043,763 | Meyer et al. | June 9, 1936 |
| 2,631,768 | Martin et al. | Mar. 17, 1953 |
| 2,639,076 | Kerr | May 19, 1953 |
| 2,827,928 | Guckel | Mar. 25, 1958 |